Jan. 4, 1944.     C. O. BRYANT     2,338,620
METHOD OF REPAIRING AN AIR BAG
Filed May 22, 1942

Inventor
CHARLES O. BRYANT
By Adam E. Fisher
Attorney

Patented Jan. 4, 1944

2,338,620

UNITED STATES PATENT OFFICE 2,338,620

METHOD OF REPAIRING AIR BAGS

Charles Oscar Bryant, Batesville, Ark.

Application May 22, 1942, Serial No. 444,128

2 Claims. (Cl. 18—45)

This invention relates to air bags conventionally employed by tire repair men and vulcanizers. In vulcanizing or repairing any and all sizes of pneumatic tires, if punctured or ruptured in any way, the repair men or vulcanizers insert the bag in the casing after the repair job is built up where the repair is to be made. Then the casing is placed in the mould, the bead plates screwed down snugly, and compressed air is filled into the air bag.

Thus when a heavy truck tire casing, or any casing, is punctured or ruptured in any way, the repair men will insert within the casing opposite the hole, rent or rupture, this heavy rubber "air bag," the same having an air tube in one end for inflating same within the casing in the process of repairing or patching the casing.

However these air bags themselves frequently break open or rupture, or the valve stems pull out, thus rendering them useless, after which they are discarded as waste. The result is a great loss of valuable rubber stock and material.

It is the prime object of the present invention, therefore, to provide a simple and effective method of repairing such damaged air bags, and so restore them for renewed use.

A further object is to provide an inflatable rubber inner tube for a ruptured air bag, combined with a method of inserting the tube in the bag and repairing the bag.

With the aforesaid objects in view, attention is now directed to the drawing as illustrating the invention and method, and wherein.

The invention is employed as a method of repairing for continued use, a conventional air bag 5, having the valve stem 6 protruded at one end, and having a rent or rupture 7 through one side, and which rent or rupture would ordinarily render the bag useless and cause it to be discarded.

Figure 1:
Figure 1 is a side view of a conventional air bag, showing a rupture or rent in one side thereof.
Figure 2:
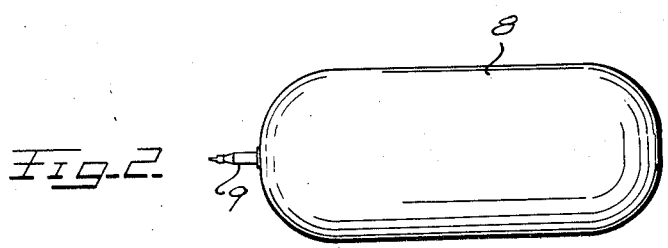
Figure 2 is a similar side view of an inflatable inner tube or bag, designed in accordance with this invention, for insertion and inflation within the ruptured air bag for repairing the same.
Figure 3:
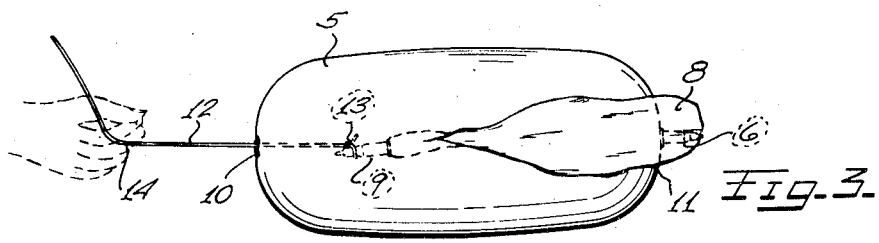
Figure 3 is a view showing the method of inserting the inner tube or bag within the air bag.
Figure 4:
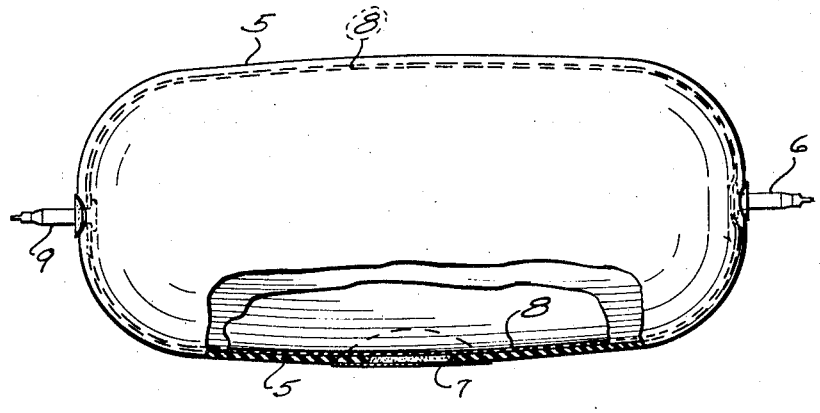
Figure 4 is a side view of the outer air bag with inner tube inserted and inflated, sections of both being broken out to show the interior arrangement of parts.

In practicing my invention, I provide a rubber inner bag or tube 8, having a valved air stem 9 at one end similar to the valve stem 6 of the outer bag 5. I then form in the end of the outer air bag, oppositely to the stem 6, an aperture or hole 10 adapted to pass the stem 9. I next cut or form through the end wall of the outer bag 5, at the side of the stem 6, an opening 11 through which the inner bag or tube 8 may be inserted. I then provide a wire 12 and tie one end to the valve stem 9, as indicated at 13. I then insert the free end of the wire 12 through the opening 11 of the outer bag 5, clear through this bag, and out through the stem hole 10. By then pulling upon the outer end of the wire 12 as indicated at 14 in Fig. 3, the inner bag 8 is drawn fully into the outer bag 5 and the valve stem 9 is drawn out through the hole 10 in proper position. The inner bag or tube 8 is then inflated through the stem 9, and the rent 7 of the outer bag 5 is filled, cemented, patched and vulcanized in conventional manner. Likewise the opening 11 and the stem hole 10, around the protruded stem 9, are similarly filled and repaired. Thus the otherwise useless air bag may readily be repaired for further use, and the method here disclosed may of course be applied to any size of air bag. Obviously too, the insert opening 11 may be formed in any other part of the bag 5, than as here illustrated, or if the rent 7 be large enough, or if it be enlarged for the purpose, then the wire 12 and inner bag 8 may be inserted therethrough instead of a separately formed opening.

While the inner bag 8 is preferably made of rubber, any other suitable fabric may be employed for the purpose, and while I have here shown and described certain specific features of the invention and method, same may be varied within the scope of the claims.

I claim:

1. The method of repairing an inflatable tire repair bag having an elongated body closed at each end and provided with a valve stem, which comprises forming an opening in one end of the bag remote from the valve stem and another opening intermediate its ends, passing a linear element through said openings and the bag, tying that end of the linear element projecting through the intermediate opening to a valve stem protruding from one end of an inflatable second bag, drawing the second bag into the tire bag through the intermediate opening and the valve stem of the second bag to protruding position through the opening in the end of the tire bag by extracting the linear element, inflating the inner bag, and sealing the intermediate and end openings as well as any other openings in the outer tire bag.

2. The method of repairing an inflatable bag of the type having an essentially tubular body closed at the ends and provided with a valve stem protruding from one end, which comprises forming an opening in the end of the bag opposite to the end equipped with the valve stem and another opening in the circumferential wall of the bag remote from the end opening, inserting one end of a linear element into the bag through the opening in the end thereof and extending said end of the element outwardly through the opening in the circumferential wall, fastening said extending end of the element to a valve stem protruding from one end of a second elongated inflatable bag, drawing the second bag into the first bag through the opening in the circumferential wall of the latter and the valve stem of the second bag to protruding position through the opening in the end of the outer first bag by extracting the linear element from the bag, inflating the inner bag, and sealing the circumferential wall opening, the end opening about the valve stem and any other openings in the outer bag.

CHARLES OSCAR BRYANT.